Patented Feb. 22, 1927.

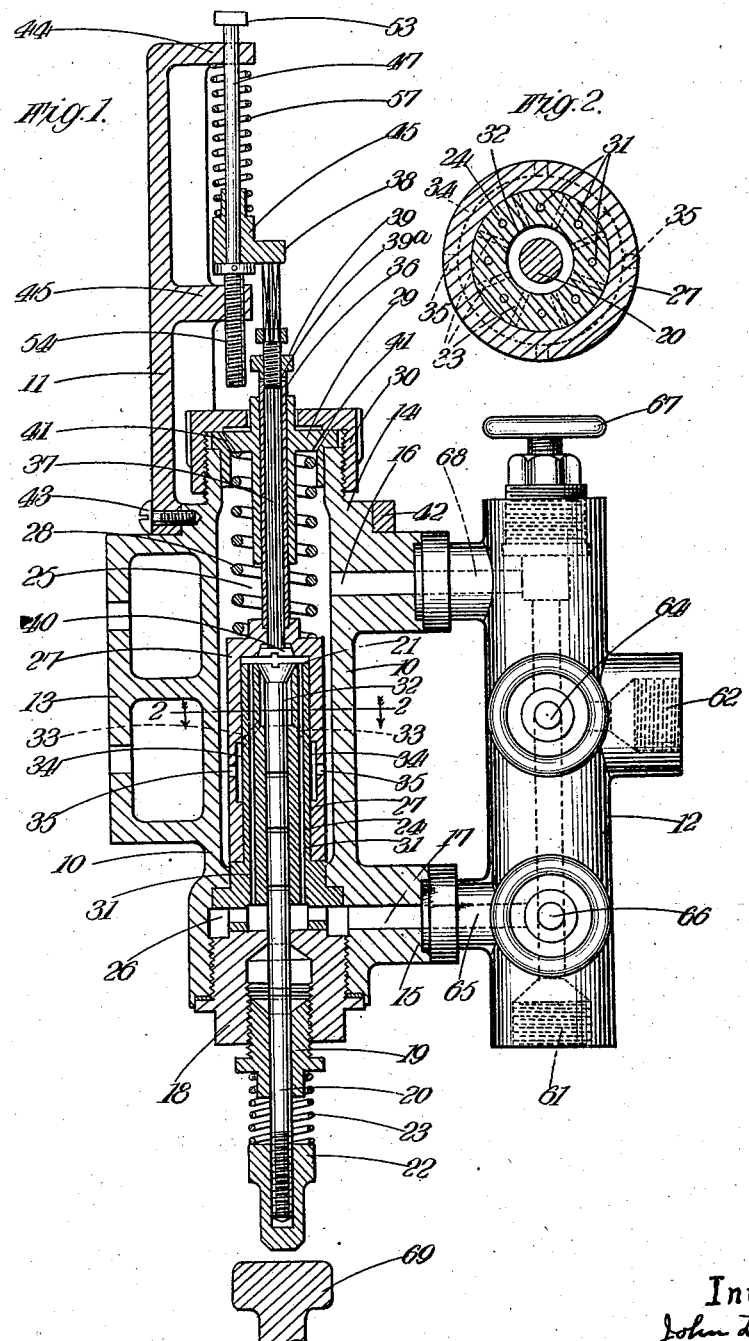

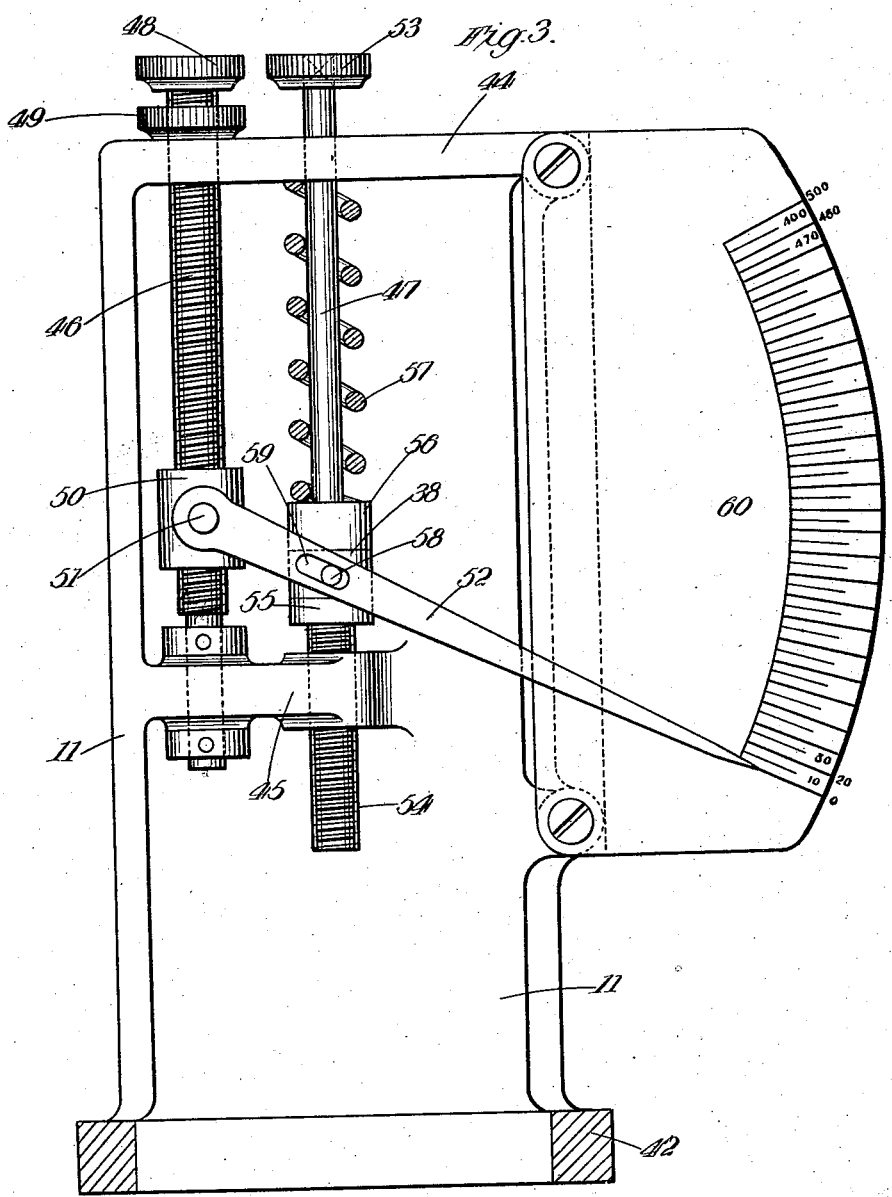

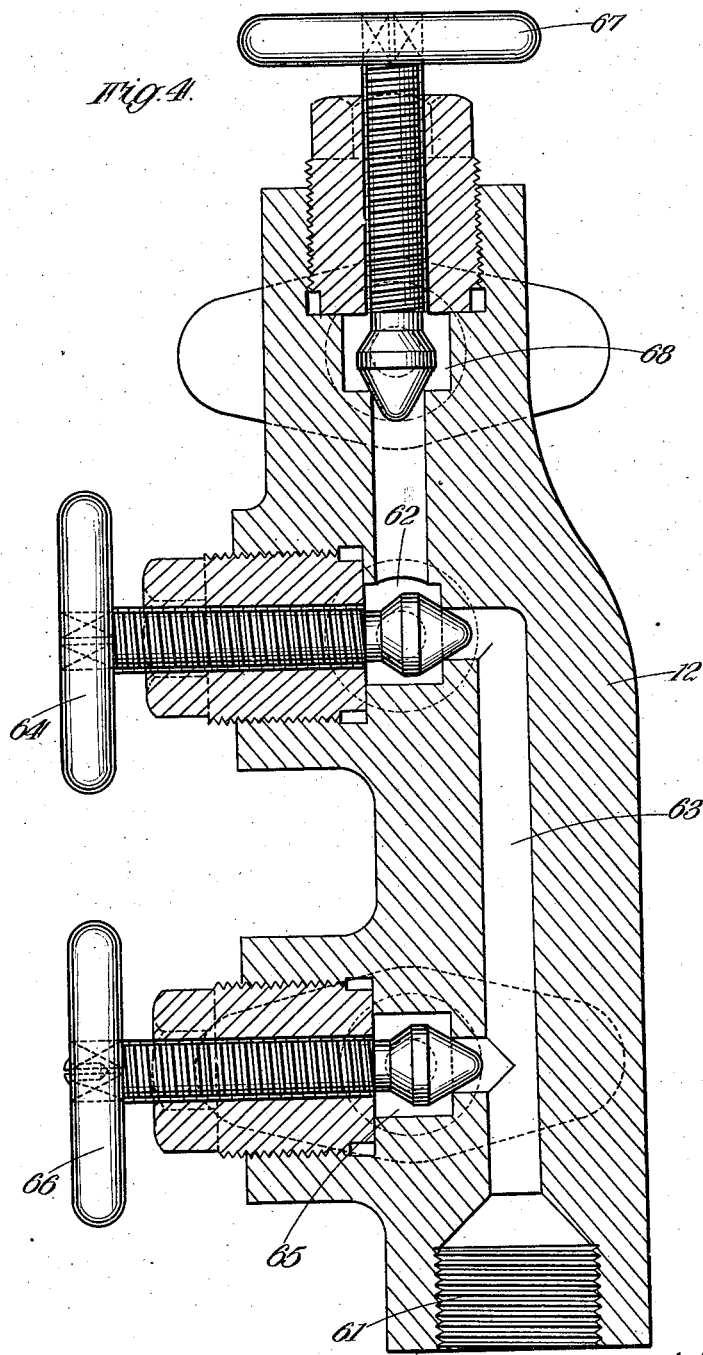

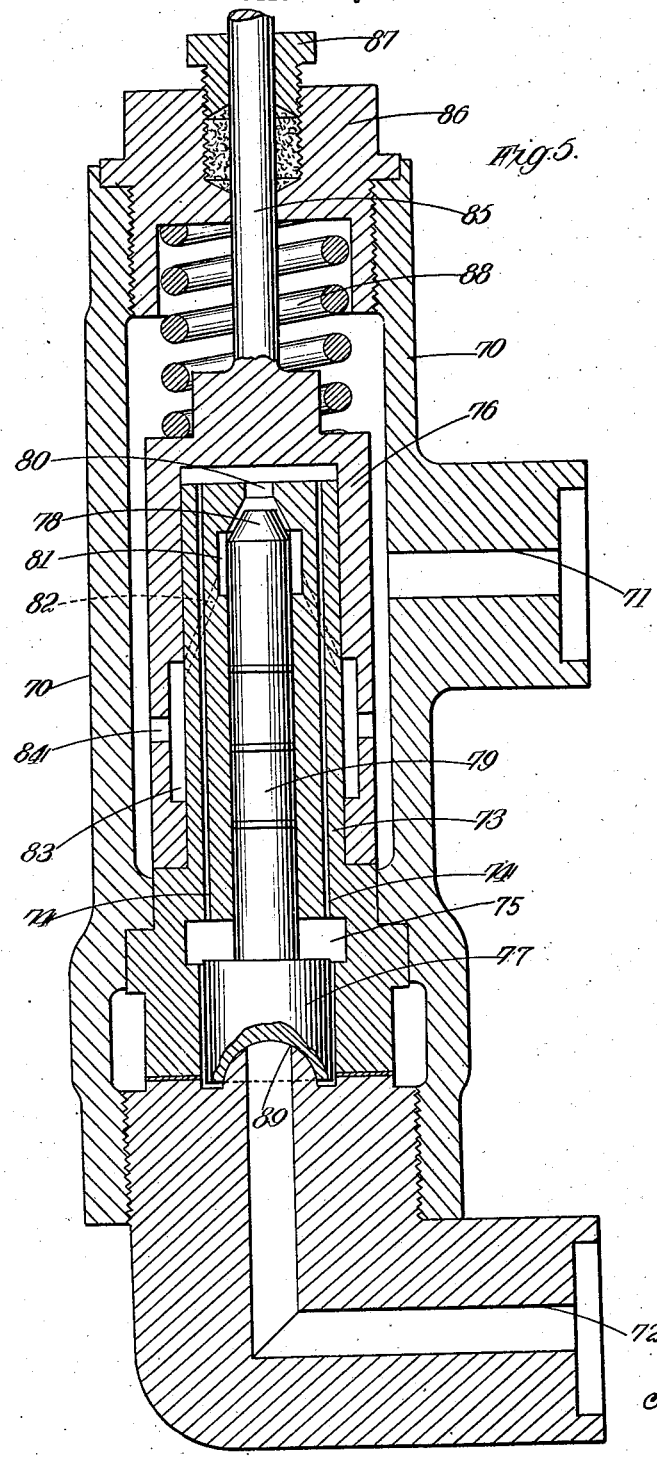

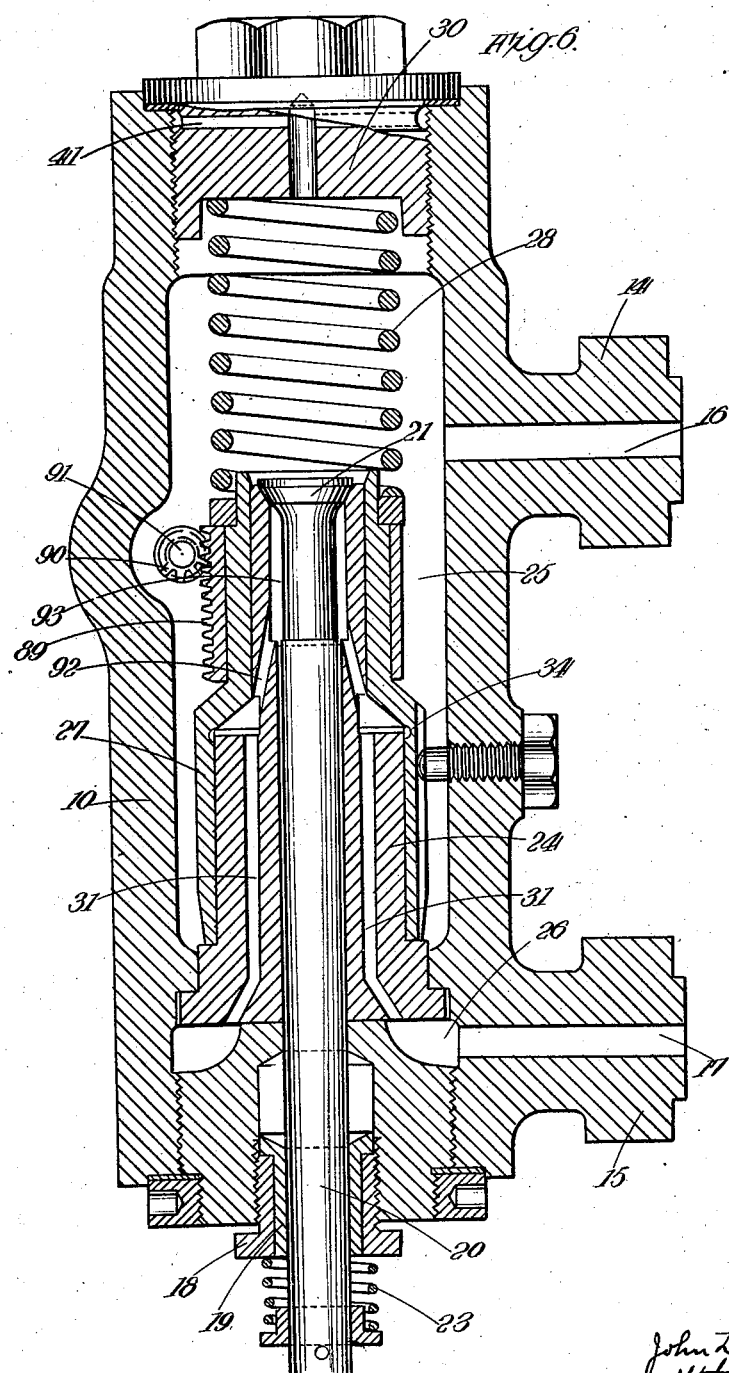

1,618,206

UNITED STATES PATENT OFFICE.

JOHN LAMB, OF WHITLEY BAY, ENGLAND.

HIGH-PRESSURE-PUMP-DISCHARGE METER.

Application filed July 9, 1926, Serial No. 121,365, and in Great Britain April 17, 1925.

This invention relates to means for measuring the quantity of fluid or semi-fluid discharged by a high-pressure reciprocating pump, and is particularly applicable to the pumps of air and solid injection oil or like engines.

The object of the invention is to provide improved means for indicating the quantity of fuel or other substance discharged at each stroke of the pump, thereby offering a ready means for enabling the power output of a line of cylinders or the output of a set of pumps to be equalized by detecting inequalities therein.

According to the present invention a pump-discharge meter comprises a cylinder, a ram, and means for indicating relative movement between said cylinder and ram, said cylinder having an inlet adapted to permit entry into the cylinder of fuel or the like during the working stroke of the pump and an outlet adapted to permit the discharge of fuel or the like from the cylinder between successive working strokes of the pump, relative movement between the ram and the clyinder being caused on the one hand, by the fuel or the like entering the cylinder and, on the other hand, by spring or like means during the discharge of the cylinder contents. If desired the outlet from the cylinder may be controlled positively (e. g. by the movement of the fuel valve mechanism of a Diesel or like engine) or automatically by the spring or like means employed for causing relative movement between the cylinder and the ram during the discharge of the cylinder contents. In the latter case the inlet to the cylinder may also be controlled automatically by the same means.

As applied to solid injection oil engines the device is interposed between the oil pump delivery valve and the injection nozzle, whilst the indicating rod may be connected by means similar to those employed in pressure indicators with a pencil or the like adapted to record movements on an indicator card actuated in the usual manner.

Preferably the cylinder is of small diameter in comparison with its length in order to obtain a large travel in proportion to the volume and if desired a bye-pass may be provided between the inlet and outlet.

By knowing the exact amount of fuel injected into each cylinder of a multiple cylinder engine, many of the troubles which result from overloading or unequal power distribution in a line of cylinders would be prevented. If such a device is fitted on the discharge side of solid injection, high pressure fuel pumps where all pumps usually discharge into a common supply pipe, partial or complete "gassing" or improper setting of any one pump would be at once apparent and excessive wear and tear due to one or more pumps doing more than an equal share of work avoided.

One measuring device may be fitted for each pump in the most convenient position anywhere between the fuel pump discharge valve and the fuel injection valve. In the case of solid injection engines, it would require to be located between the fuel pump discharge valve and the main supply pipe into which all pumps deliver. In engines where direct injection is employed as in hot bulb engines the position would be as for air injection engines.

The invention will be described with reference to the accompanying drawings, of which Figure 1 is a side elevation partly in central vertical section, Figure 2 is a fragmentary sectional plan on the line 2—2 of Figure 1 to an enlarged scale, Figure 3 is a front elevation to an enlarged scale of an indicator mechanism, Figure 4 is a sectional front elevation to an enlarged scale of the bye-pass valves shown in Figure 1, and Figures 5 and 6 are sectional side elevations of two modified forms of the invention.

As shown in Figures 1 and 2 the flowmeter includes a measuring device enclosed in a casing 10, an indicating mechanism carried by a frame 11 mounted upon the casing 10 and bye-pass valves provided in a body 12 supported by the casing 10. Referring more particularly to the measuring device or flowmeter proper, the casing 10 is substantially cylindrical but is furnished on one side with a boss or bracket 13 for mounting purposes, and on the opposite side with two bosses 14, 15 near the top and bottom respectively, the one (14) being apertured as at 16 to form an outlet and the other (15) being similarly formed with an inlet 17. The lower end of the casing 10 is bored out for the reception of a screwed plug 18 which, with a gland 19, constitutes a stuffing box for a valve spindle 20 bearing at its upper end a poppet valve 21 and at its lower end a tappet 22 between which and the gland 19 extends a compression spring 23. The valve spindle 20 extends axially through and is adapted to reciprocate oiltight within a fixed ram 24, the lower end of which divides the interior of the casing 10 into an upper part 25 and a small lower part 26 in communication the one (25) with the outlet 16, and the other with the inlet 17. Upon the ram 24 an inverted cylinder 27 fits slidably and is influenced towards the ram by means of a heavy spring 28, the upper end of which abuts on a gland 29 which, together with a screwed cap 30 serves to close the upper end of the casing 10. The ram 24 is formed with a circular series of small longitudinal passages 31 . . . which establish communication between the part 26 of the casing 10 and the interior of the cylinder 27. Immediately beneath the seating of the valve 21, the bore of the ram 24 which accommodates the valve spindle 20 is increased in diameter as at 32 and from the lower end of this portion of increased diameter a series of diagonally extending passages 33 lead to the exterior of the ram into an internal circumferential groove 34 in the bore of the cylinder 27 which communicates through apertures 35 in the cylinder wall with the part 25 of the casing 10. The cylinder 27 is connected by means of a tubular rod 36, through which extends a fluted valve spindle 37, with a lug 38 on the indicator mechanism carried by the bracket 11, the latter part of the connection being through the medium of the tail of said spindle 37. The rod 36 passes in an oiltight manner through the gland 29 and is secured to the cylinder 27 by the clamping action of a nut 39 at its upper end, threaded onto the spindle 37, and a poppet valve 40 on the lower end of said spindle which makes a seating inside the upper end of the cylinder 27 through which the spindle passes. The gland 29 is formed with a number of diagonally extending holes 41 extending from the interior of the casing 10 and adapted to be closed at their upper ends by the cap 30 when the latter is screwed home.

As shown in Figures 1 and 3, the indicating mechanism is carried by an upright frame 11 having a ring-like base 42 which engages with the top of the casing 10 and is secured thereto by means of a screw 43. The frame 11 has two horizontal lugs or flanges 44 and 45, the one at its top and the other intermediately of its height and between said lugs, and rotatable in bearings therein, are two vertical rods 46 and 47. The rod 46 is screw threaded upon the upper and greater part of its length, and is provided with a milled head 48 and a lock nut 49 so as to be cabaple of being rotated or locked at will, whilst a nut 50 formed with trunnions such as 51, is threaded onto said rod 46 and constitutes a fulcrum for a lever or pointer 52. The second rod 47 is provided with a milled head 53 at its upper end, but whilst its lower end is screw threaded as at 54 so as to engage with a correspondingly threaded hole in the lug 45, its upper and longer portion is plain, so as to be slidable and rotatable in the lug 44. Between the screwed and plain portions of the rod 47 is a thrust collar 55 upon which rests a block 56 slidable upon said rod 47 and carrying the lug 38 with which the piston rod 36 of the flowmeter engages. The block 56 is influenced towards the thrust collar 54 by means of a spring 57 which surrounds the rod 47, said block carrying a horizontal pin 58 which engages with a longitudinally extending slot 59 in the pointer 52. Up and down movement of the block 56 causes the pointer 52 to move over a scale 60 secured to the frame 11, whilst adjustment of the screwed rod 46 causes the nut 50 to move up or down and tilt the pointer 52 about the pin 58 in order that a zero adjustment of the pointer may be effected.

By means of a bye-pass as shown in Figures 1 and 4, the flowmeter may be put into or out of action as desired. The bye-pass, as shown, consists of a body 12 provided with an inlet 61 for fuel or the like from a pump and an outlet 62 to an engine cylinder (not shown), connected by means of a passage 63, said outlet 62 being controlled by a screw-down valve 64. A second outlet 65 controlled by a screw-down valve 66 leads from the passage 63 to the flowmeter inlet 17, and a third screw-down valve 67 controls a passage 68 leading from the flowmeter outlet 16 to the bye-pass outlet 62 at the back of the valve 64. When the valves 66 and 67 are open and the valve 64 is closed, the flowmeter is in circuit, but when the three valves are in their alternative positions the fuel or the like may flow directly from the inlet 61 to the outlet 62. If desired the bye-pass may be duplicated for each additional cylinder to be supplied, the arrangement being such that the flowmeter may be connected in circuit at will with the fuel supply of any cylinder in a multicylinder engine.

Assuming the flowmeter to be connected in an oil fuel supply system, oil enters the inlet 17 during the operative stroke of the supply pump and flows by way of the passages 31 to the interior of the cylinder 27. Any air which may have been trapped in the passages or cylinder may be released by slackening the nut 39 and thus opening the valve 40. This valve 40 is left open until oil escapes from between the piston rod 37 and the nut 39 which may be radially grooved on its under surface as at 39ᵃ to facilitate such escape. The valve 40 is then closed and the increasing amount of oil entering the cylinder 27 causes the latter to rise against the action of the spring 28. At the end of the pump stroke the pump outlet valve closes, and the cylinder 27 remains stationary and filled with oil until a tappet-rod 69 (Figure 1), controlled by the engine valve gear, lifts the tappet 22 and opens the poppet valve 21. Oil from the cylinder 27 (maintained under pressure by the action of the spring 28) then escapes past the valve 21 to the groove 32 and thence by way of the passages 33, the recess 34 and apertures 35 to the part 25 of the casing 10. In order to ensure that no air is trapped in the part 25, the cap 30 may be slackened until all the air has escaped through the holes 41.

As the cylinder 27 rises, an amount of oil equal in volume to that entering the cylinder is forced through the outlet 16, and by way of the valve 67 to the engine cylinder, and since the cylinder 27 is of uniform bore, the stroke of the cylinder 27 is directly proportional to the volume of oil fed to the engine cylinder. This movement of the cylinder 27 is communicated to the pointer 52 by way of the rod 36, valve spindle 37 and block 56 and thus the pointer 52 indicates on the scale 60, which may be calibrated directly in volume, the amount of fuel supplied to the particular engine cylinder at each working stroke.

Figure 5 illustrates a modification of the invention which is substantially similar to that described with reference to Figures 1 and 2, apart from the fact that it is automatically controlled. As shown in Figure 5 the flowmeter consists of a substantially cylindrical casing 70 provided with an outlet 71 and an inlet 72 adapted to be connected with a bye-pass such as described with reference to Figures 1 and 4. Within the casing 70 is a coaxially disposed fixed ram 73, the lower part of which is secured in the casing 70, and which is furnished with a series of longitudinal passages 74 extending from a recess 75 in the base of the ram to the upper end of said ram 73 where they open into the interior of an inverted cylinder 76 which is adapted slidably to fit over said ram. The recess 75 serves to accommodate the lower end 77 of a piston valve 78 the spindle 79 of which is adapted to fit slidably and oil-tight within an axial passage in the ram. The valve 78 is adapted to control an aperture 80 in the upper end of the ram 73 leading to an internal circumferential groove 81 from which oblique passages 82 in the ram lead to a circumferential recess 83 in the skirt of the cylinder 76 which in turn is open by way of apertures 84 to the interior of the casing 70. The said passages and recesses 74, 81, 82, 83 and 84 correspond exactly in arrangement and function with the similar passages and recesses 31, 32, 33, 34 and 35 respectively described with reference to Figures 1 and 2.

From the upper end of the cylinder 76 a coaxial rod 85 extends through a stuffing box 86 and gland 87 in the upper end of the casing 70 to indicating mechanism (not shown) similar to that described with reference to Figures 1 and 3, said cylinder 76 being influenced towards the ram 73 by means of a heavy spring 88 which surrounds the rod 85 and abuts on the stuffing box 86. The lower end 77 of the piston valve 78 is freely slidable in the recess 75, so that oil or the like may flow therearound with reasonable freedom, and constitutes a valve for controlling an inlet orifice 89 in free communication with the inlet 72.

Oil or the like entering the inlet 72 forces up the spindle 79 and closes the valve 78 and, passing through the orifice 89 and around the lower end 77 of the valve 78, enters the interior of the cylinder 76 by way of the recess 75 and passages 74. The valve 78 being closed, the cylinder 76 rises against the force of the spring 88 and causes an amount of oil equal to that entering from the inlet 72, to be forced from the interior of the casing 70 to the outlet 71, and so to the engine cylinder (not shown). The rise of the cylinder 76 represents the amount of oil discharged and is indicated by the external indicating mechanism as previously described.

When the pressure of oil entering the inlet 72 drops below that in the cylinder 76, e. g. at the end of the supply pump stroke, the valve spindle 79 falls causing the valve 78 to open and the lower end to close the orifice 89. Oil from the cylinder 76 then flows out through the aperture 80, groove 81, oblique passages 82, recess 83 and apertures 84 to the interior of the casing 70 and the cylinder 76 falls. Upon each successive stroke of the feed pump the cycle of operations just described is repeated. The clearance around the lower part 77 of the valve 78 is so proportioned as to ensure that the pressure on the underside thereof is slightly greater than that existing on the upper side during the discharge period of the pump.

The working surfaces are preferably of steel, case hardened and ground. They require to be an ordinary good fit only since although the pressures in the device may be from 1,000 to 10,000 lbs. per sq. inch the pressure tending to cause leakage between the moving and stationary parts amounts to only a few pounds per sq. inch, i. e. the load exerted by the spring.

The form of the invention shown in Figure 6 is substantially similar to, and functions in substantially the same manner as, that illustrated by Figures 1 and 2, like reference letters indicating similar parts in those figures, but the connection with the indicating mechanism and the arrangement of the release valve are different.

In Figure 6 the cylinder 27 is shown as being provided with a rack 89 meshing with a pinion 90 on a spindle 91 carried in bearings in the casing 10 and this spindle 91 is adapted to actuate the lever or pointer 52 (Figure 3) either directly or through known mechanism, not shown.

Whilst in Figures 1 and 2 the valve 21 is adapted to permit oil to flow from the interior of the cylinder 27 to the chamber 25 by way of passages 32, 33, 34 and 35, the valve 21 of Figure 6 is adapted to afford direct connection between the cylinder 27 and the chamber 25, passages 92 and 93 leading from the interior of said cylinder 27 to said valve 21.

I claim:—

1. A pump discharge meter comprising a cylinder, a ram, and means for indicating relative movement between said cylinder and ram, said cylinder having an inlet adapted to permit entry into the cylinder of fuel or the like during the working stroke of the pump and an outlet adapted to permit the discharge of fuel or the like from the cylinder between successive working strokes of the pump, relative movement between the ram and the cylinder being caused, on the one hand, by the fuel or the like entering the cylinder and, on the other hand, by resilient means during the discharge of the cylinder contents.

2. A pump discharge meter as claimed in claim 1, wherein the outlet from the cylinder is controlled positively, substantially as set forth.

3. A pump discharge meter as claimed in claim 1, wherein the outlet from the cylinder is controlled automatically by the spring or like means employed for causing relative movement between the cylinder and the ram during the discharge of the cylinder contents.

4. A pump discharge meter as claimed in claim 3, wherein the inlet to the cylinder is controlled automatically by the same means as are employed to control the outlet.

JOHN LAMB.